A. H. BOYD.
AUTOMATIC QUICK CLOSING VALVE.
APPLICATION FILED NOV. 14, 1905.
900,260.
Patented Oct. 6, 1908.
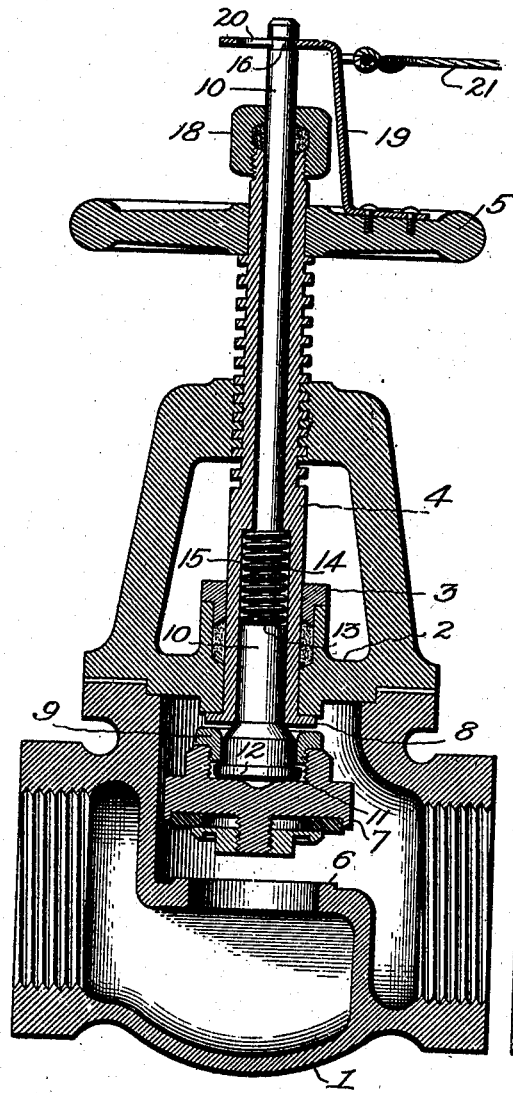
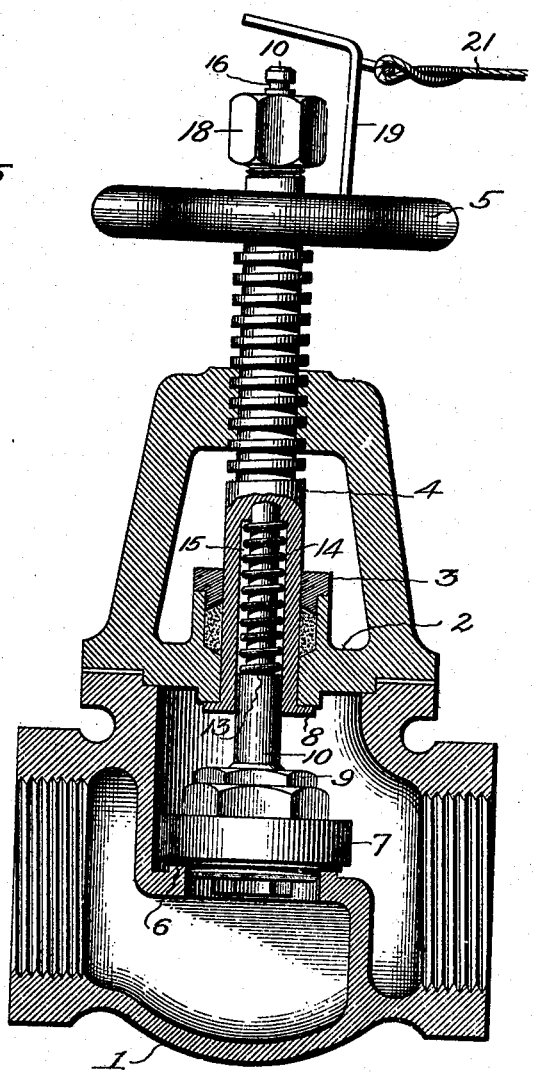

A. H. BOYD.
AUTOMATIC QUICK CLOSING VALVE.
APPLICATION FILED NOV. 14, 1905.
900,260.
Patented Oct. 6, 1908.
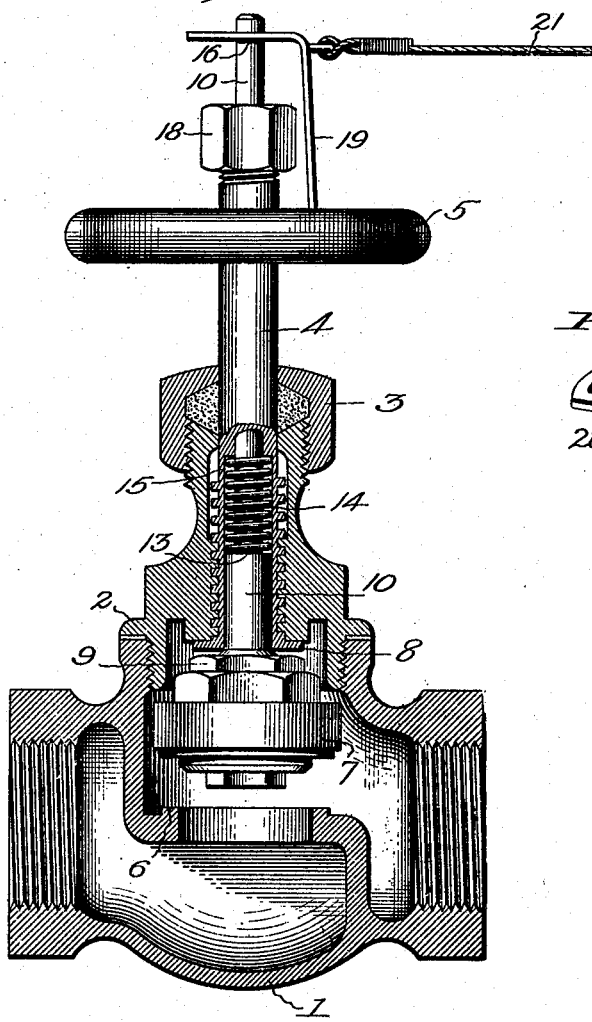
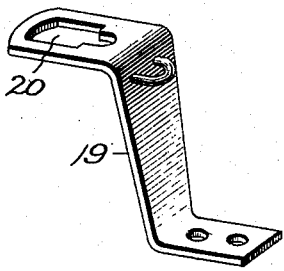

UNITED STATES PATENT OFFICE.

ALBERT H. BOYD, OF LEADVILLE, COLORADO.

AUTOMATIC QUICK-CLOSING VALVE.

No. 900,260.　　　Specification of Letters Patent.　　　Patented Oct. 6, 1908.

Application filed November 14, 1905. Serial No. 287,376.

*To all whom it may concern:*

Be it known that I, ALBERT H. BOYD, a citizen of the United States of America, residing at Leadville, county of Lake, and State of Colorado, have invented a new and useful Automatic Quick-Closing Valve, of which the following is a specification.

My invention relates to improvements in valves, and the objects of my invention are:
First, to provide an automatic quick closing valve. Second, to provide an automatic spring controlled instantaneous closing valve. And third, to provide a distributing and cutoff valve, that is adapted to be used for steam generating and steam distributing plants, and that is a manually operating valve, and an instantaneously closing valve that can be closed from any predetermined distant point by any one in the vicinity in case a steam pipe or joint bursts or breaks. I attain these objects by the mechanism illustrated in the accompanying drawings, in which:

Figure 1, is a vertical, longitudinal sectional view of a yoke cap valve, showing my improvements applied thereto, the valve disk being raised or off of its seat. Fig. 2, is a similar view, the valve disk being shown down or upon its seat, the spring which holds the auxiliary valve stem up being drawn to one side, permitting the expansion spring to throw the stem down. Fig. 3, is a vertical, longitudinal sectional view, showing my invention applied to a screw cap valve. And Fig. 4, is a perspective view of the auxiliary valve stem-holding spring.

Similar letters of reference refer to similar parts throughout the several views.

Referring to the drawings,—the numeral 1, designates the body of a valve embodying my invention; 2, designates the cap thereof, which may be either a bolted flange yoke cap or a screwed cap; 3, designates the gland or the nut; 4, the valve stem; 5, the valve stem hand wheel; 6, the valve seat; and 7, the valve disk, these several parts being common elements of a valve, that are used coöperatively with my invention, although they are not elements of it.
My invention has been designed to be applied especially to globe valves, although it may be used with other types of valves. The common valve stem, which is threaded to the cap and which is normally connected to the valve disk, is separated from it in my invention, and its lower end is provided with collar 8, which is adapted to bear against the nut 9, that forms the top part of the valve disk 7. The valve disk 7, which may be of any suitable construction to fit the valve seat, is provided with an auxiliary valve stem 10, which is connected to it in a suitable manner, but preferably by a socket joint, which is made as follows: The valve disk is provided with a hollow chamber 11, the entrance to which is closed by the nut 9, which is provided with a short extension that is threaded into it, and the lower end of the stem is provided with a head portion 12, which fits loosely in the chamber of the disk, while the nut is provided with a smaller aperture than the chamber, through which the stem of the valve disk extends loosely. The auxiliary valve stem is formed in two diameters, at the junction of which a shoulder 13, is formed. A coiled spring 14, is mounted on the smallest diameter of the stem, the lower end of which bears against the shoulder 13, which forms an abutment for it. The common or main valve stem 4, is provided with an axial aperture 15, which is also made in two diameters, that are adapted to receive slidably the two diameters of the auxiliary valve disk stem, and the spring 14, the upper end of which bears against the shoulder formed at the junction of the two apertures in the common valve stem, the larger aperture of which is extended into the valve stem far enough to extend over the spring when at its normal extended length, and to form an abutment shoulder for its upper end. The auxiliary valve disk stem is made long enough to extend through and beyond the main stem a short distance, which is a little greater than the travel of the valve disk to and from its seat, and close to the end of the stem I form an annular circumferential recess 16, which forms a reduced neck portion in the stem. The hand wheel of the valve stem is keyed or otherwise secured to the main stem at a short distance from its end, while the end of the stem is threaded and a packing nut 18, is threaded to it. This nut contains a central aperture through which the auxiliary stem extends, and this nut 18, is used to pack the auxiliary stem. To the main stem or to the hand wheel, but preferably to the hand wheel, I secure one end of a blade spring 19, the opposite end of which is bent at right angles to the body of the stem towards the stem and contains an oblong slot 20, which fits loosely over the end of the stem and is resiliently positioned relative to the reduced neck portion of the stem so that the nearest side of the slot to the blade of the spring will normally bear resiliently in the recess 16 and against the neck. The auxiliary stem is thus releasably locked to the hand wheel, and to the main valve stem, and normally is moved to open and close the valve disk to and from the valve seat, when the hand wheel is turned to either open or close the valve. To the upper end of the spring, I secure one end of a cord or of several cords, 21, the opposite end of which is extended to any predetermined point or to different points in a mine or factory.

The operation is as follows: The auxiliary stem is pulled up through the main stem until the top of the valve disk rests against the bottom of the collar 8, on the end of the main stem, in which position the edge of the slot of the spring 19, will spring resiliently into the recess 16, against the neck of the stem, and lock the stem to the wheel, and when the auxiliary stem is pulled up, the spring 14, is compressed against the shoulder in the main stem so that when the stem is locked to the hand wheel by the blade spring, the spring 14 and the auxiliary stem, are under resilient expansive compression. Then if the hand wheel is turned, the main stem turns with it, and as the main stem is turned to move in or out of the cap, the auxiliary stem and valve disk travel with it, and the valve disk can be closed on its seat or opened in any desired part of its travel or lift, by turning the hand wheel; consequently, the normal operation of the valve is like that of the globe valves in common use. When, however, a steam pipe or fitting or joint bursts or breaks, and steam escapes, as for instance in the bottom of a mining shaft or tunnel, to which one or several cords may lead, or to the different levels of a shaft or to different floors of a factory or manufacturing plant, a long distance from the boiler or boilers, any person can grasp the cord and by pulling it pull the spring out of engagement with the stem, which releases the auxiliary stem, and the spring 14, instantly throws the valve disk down on its seat, and closes the valve. Then after the break is fixed, the valve disk is again locked to the hand wheel by lifting it and locking the blade spring in the neck of the stem.
My invention is simple, practical, not liable to get out of order, and places at the hands of workmen or employers a means of quickly shutting off steam at the steam generating plant from any one or from a number of different points at long distances from the steam generating plant.

Having described my invention, what I claim as new and desire to secure by Letters Patent, is:
1. In an automatic quick-closing valve, the combination with the valve seat, the valve disk, and the main valve stem, of an auxiliary valve stem arranged to be normally connected to said main stem, and means connected with said auxiliary stem for instantaneously releasing it from the said main stem and means for closing the valve upon such release.

2. In an automatic quick-closing valve, the combination with the valve seat and disk, and the hollow main valve stem, provided with a hand operating wheel, of an auxiliary valve stem connected at one end to said valve disk and extending loosely through said hollow main valve stem, a spring arranged between said main and auxiliary valve stems to hold said auxiliary stem and valve disk under closing compression, and means including a spring, connected at one end to said hand wheel, and to said auxiliary valve stem at its opposite end, for releasing said auxiliary stem and valve disk, and instantaneously closing said valve, as set forth.

3. In an automatic quick-closing valve the combination with the valve seat, a main stem threaded to the cap of the valve, a hand wheel secured to said stem, an auxiliary stem extending loosely through said main stem, a valve disk connected to the lower end of said stem in operative relation to said valve seat, means for connecting said auxiliary valve stem to said main stem to manually operate the auxiliary valve stem, and means for disconnecting said auxiliary valve stem, as set forth.

4. In an automatic quick-closing valve, the combination with the body of the valve, the valve seat therein, the cap, the main stem, threaded to said cap, and provided with an axial aperture of two diameters, and the hand wheel secured to said main stem, of an auxiliary stem of two diameters slidably mounted in said main stem, a coiled expansive spring in said main stem arranged to bear at one end in the counter-bore of said main stem, a valve disk secured to the lower end of said auxiliary stem, in operative relation to said valve seat, a slot in the upper end of said stem, a spring secured at one end to said hand wheel and arranged to engage the slot of said stem, and a cord secured at one end to said spring and leading to a predetermined point, as set forth.

5. In an automatic quick-closing valve, the combination with the body of the valve, having a valve seat and a flanged cap, of a main stem threaded to said cap and having a collar at its lower end, a hand wheel adjacent to its upper end, and a packing nut threaded to its upper end, an auxiliary stem extending slidably through the axial center of said main stem and its packing nut, and having a valve disk at its lower end arranged in operative valve-seating relation to said valve seat, an expansive spring arranged between said auxiliary stem and said main stem, and a spring secured to said wheel and arranged to resiliently hold said auxiliary stem under resilient expansive pressure in said main stem, and means including a cord or cords connected at one end to said stem-holding spring, and extending to a predetermined point or points for releasing said auxiliary stem, as set forth.

6. In an automatic quick-closing valve, the combination of the valve body and valve seat, the main stem having a collar at its lower end and a packing nut at its upper end, and the hand wheel secured to the upper end of said main stem, with the auxiliary stem slidably mounted in said main stem, the coiled spring on said stem arranged to be compressed in said main stem, the valve disk connected to said stem in operative relation to said valve seat, and means including a spring for locking said auxiliary stem and valve disk under resilient expansive pressure in said main stem and cap, and means for releasing the same from a predetermined point, at a distance from said valve, as set forth.

7. In an automatic quick-closing valve, the combination with the auxiliary valve stem and the valve disk attached thereto, of the valve body and the valve seat, the main stem threaded to said valve body, the hand wheel secured to said main stem and arranged to surround and support said auxiliary valve stem and said valve disk, in operative relation to said valve seat, the disk-actuating spring arranged between said main and auxiliary valve stems to exert a constant closing pressure on said disk, the spring attached at one end to said hand wheel and releasably secured at the opposite end to said auxiliary valve stem, and the cord for operating said hand-wheel spring, to release said auxiliary valve stem and disk, whereby said disk actuating spring closes said disk against its seat, as set forth.

8. In an automatic quick-closing valve, the combination of the valve body and valve seat, and the independent main stem, provided with a hand wheel and threaded to the main body, with a stem carrying a valve disk in operative relation to said valve seat, means including a spring for holding said stem and valve under expansive resilient pressure in said main stem, and means including a cord for releasing said valve disk and its stem from said main stem, whereby said valve disk is released and is instantaneously thrown and impinged and held against said valve seat and closes said valve, as set forth.

9. In an automatic quick-closing valve, the valve having a valve seat, and a manually operating threaded valve-closing stem, and handle, an auxiliary valve stem connected to the valve disk of said valve, means including a spring for holding said valve disk and its auxiliary stem under compressive resilient pressure in operative relation to said valve seat, means including a spring-controlled auxiliary valve stem locking device for normally securing said auxiliary stem to said manually operating stem and its handle, whereby said valve disk may be manually operated to move said auxiliary stem and valve disk to and from said seat to open or close said valve, and means including a cord for releasing said auxiliary stem's locking device and valve disk from said manually operating stem and handle, from a predetermined distant point, whereby said valve disk is instantly impinged by resilient pressure against said valve seat and said valve is instantly closed, as set forth.

10. In an automatic quick-closing valve, a valve body having a valve seat, and a valve body cap, a main valve stem threaded in said valve body cap, a hand operating wheel secured to said main valve stem, a valve disk operatively mounted in said valve body in operative relation to said valve seat, an auxiliary valve stem connected to said valve disk, means including a spring for locking said auxiliary stem and valve disk under compressive resilient spring pressure to said main valve stem, and wheel, and means including a cord for releasing said auxiliary stem and valve disk from said main valve stem and wheel, whereby said valve disk is instantly closed on said valve seat by resilient spring pressure, as set forth.

In testimony whereof I affix my signature in presence of two witnesses.

ALBERT H. BOYD.

Witnesses:
G. SARGENT ELLIOTT,
BESSIE THOMPSON.